United States Patent
Tang et al.

(10) Patent No.: US 6,947,997 B2
(45) Date of Patent: Sep. 20, 2005

(54) METHOD FOR CONTROLLING ETHERNET DATA FLOW ON A SYNCHRONOUS DIGITAL HIERARCHY TRANSMISSION NETWORK

(75) Inventors: Yong Tang, Shenzhen (CN); Jianfei He, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 0 days.

(21) Appl. No.: 10/779,572

(22) Filed: Feb. 13, 2004

(65) Prior Publication Data

US 2004/0160972 A1 Aug. 19, 2004

Related U.S. Application Data

(63) Continuation of application No. PCT/CN02/00370, filed on May 30, 2002.

(30) Foreign Application Priority Data

Dec. 19, 2001 (CN) .................................... 01143099 A

(51) Int. Cl.[7] .............................................. G06F 13/00
(52) U.S. Cl. ........................ 709/232; 709/238; 709/249
(58) Field of Search ................................. 709/232, 238, 709/249, 230, 234, 235, 248; 710/29, 52, 56, 57

(56) References Cited

U.S. PATENT DOCUMENTS

| 5,581,566 | A | | 12/1996 | St. John et al. |
| 5,673,254 | A | | 9/1997 | Crawford |
| 5,956,347 | A | * | 9/1999 | Slater ........................ 370/503 |
| 6,170,022 | B1 | * | 1/2001 | Linville et al. ............... 710/29 |
| 6,192,422 | B1 | * | 2/2001 | Daines et al. ................. 710/29 |
| 6,567,413 | B1 | * | 5/2003 | Denton et al. .............. 370/401 |
| 6,628,613 | B1 | * | 9/2003 | Joung et al. ................ 370/230 |
| 6,658,457 | B2 | * | 12/2003 | Nishikawa et al. ......... 709/206 |
| 6,754,179 | B1 | * | 6/2004 | Lin ............................ 370/235 |
| 6,757,348 | B1 | * | 6/2004 | Vila et al. ................... 375/372 |
| 2003/0007513 | A1 | * | 1/2003 | Barker et al. ............... 370/476 |

FOREIGN PATENT DOCUMENTS

EP          1006751 A2      6/2000

* cited by examiner

*Primary Examiner*—Viet D. Vu
(74) *Attorney, Agent, or Firm*—Harness, Dickey & Pierce, P.L.C.

(57) ABSTRACT

The invention discloses a method for controlling Ethernet data flow on a synchronous digital hierarchy (SDH) transmission network. The method comprises: step a) setting a data buffer at receiving direction of a programmable logic array; and step b) setting a receiving high threshold-value and a receiving low threshold-value for the buffer. When applying the method, remote transmission of SDH facilities keeps the data flow control effective, so remote transmission of Ethernet data is reliable.

10 Claims, 2 Drawing Sheets

METHOD FOR CONTROLLING ETHERNET DATA FLOW ON A SYNCHRONOUS DIGITAL HIERARCHY TRANSMISSION NETWORK

CROSS-REFERENCE TO RELATED APPLICATIONS

This application is a continuation of PCT/CN02/00370 filed May 30, 2002,.which claims the benefit of Chinese Patent Application No. 01143099.0 filed Dec. 19, 2001. The disclosures of the above applications are incorporated herein by reference.

FIELD OF THE INVENTION

The present invention relates generally to Ethernet data flow control, and more particularly to a Ethernet data flow control method which uses buffer storage at receiving end of a synchronous digital hierarchy (SDH) transmission network to store the Ethernet data, and sends out a flow control frame according to situation of the current data volume in the buffer storage.

BACKGROUND OF THE INVENTION

During transmission of Ethernet frame data on a SDH transmission network, when transmitted data volume at the sending end excesses possible receiving data volume at the receiving end, and has not been aware, then huge data will be lost. Therefore, it is necessary to have a data flow control to guarantee that data transmission is normal and reliable.

At present, in an Ethernet data packet, there is only one kind of control frame defined, it is flow control frame (such as PAUSE frame). The PAUSE frame controls data flow through a time parameter. When the sending data volume is greater than the possible receiving data volume, the receiving end will send a PAUSE frame to the sending end and the sending end will pause data sending. When the receiving end can normally receive data, the receiving end will again send a PAUSE frame to allow the sending end to send data normally. When sending a PAUSE frame, the PAUSE frame is directly inserted to a data queue, but cannot interrupt the data being sending, so the PAUSE frame must wait until the current data sending is finished then the PAUSE will be sent. In the receiving port, when a PAUSE frame is received, first it is detected, interpreted and analyzed. After the PAUSE frame has been identified and recognized, flow control operations will be made accordingly, such as setting flow control data, flow control time etc.

Although, the flow control with PAUSE frame is a safely manner for data packet transmission, but because of transmission delay, the flow control is effective only within a limited scope, in general it is several hundred meters. Nevertheless, at present many SDH facilities needs to transfer Ethernet data with distance far more then several ten kilometers, or even several hundred kilometers. Therefore, flow control is an important and unsolved problem.

SUMMARY OF THE INVENTION

Based on this consideration, main purpose of the invention is to provide a flow control method for Ethernet data on a SDH transmission network. With this method, it is obtained that when the SDH facilities makes remote transmission, the flow control is still effective, and the long distance transmission of Ethernet data is still reliable.

A method to control Ethernet data flow on a SDH transmission network at least includes the following steps:

a. setting a data buffer at receiving direction of a programmable logic array;

b. setting a receiving high threshold-value and a receiving low threshold-value for the buffer.

Said buffer is a synchronous data random access memory (SDRAM). Size of the buffer is determined by Ethernet data transmission distance on the SDH transmission network, delays of SDH facilities, stations number of network elements, delays of network elements, delay compensation of the SDH network, transmission rate of Ethernet ports and inner processing delay of an Ethernet.

The method further includes the following steps:

c. when buffering data, the system monitors current data volume in the data buffer in real time and detects whether the current data volume reaches the receiving high threshold-value;

d. if current data volume in the data buffer reaches the receiving high threshold-value, then receiving end sends out a flow control frame with time parameter and returns to step c;

e. if current data volume in the data buffer does not reach the receiving high threshold-value, then the system detects whether the current data volume in the buffer reaches the receiving low threshold-value. If it so, then the receiving end sends out a flow control frame with zero time parameter and the system returns to step c. Otherwise, the system returns to step c directly.

Wherein, the receiving threshold-value is determined by transmission distances of Ethernet data on a SDH transmission network, delays of SDH facilities. Said a time parameter in a flow control frame is the longest time for pausing data sending at the sending end. The time parameter is defined by the standard protocol.

It can be seen from the scheme mentioned above, it is essential for the invention that: setting a buffer at receiving end and sending appropriate flow control frame to control the data flow according to the situation of current data volume in the buffer area.

In the invention, an enough capacity of a buffer storage (SDRAM) is set at the receiving end. Therefore, when the receiving end cannot processed the data having been sent by the sending end, the data having not been processed can be stored in the SDRAM, and a flow control frame is sent to the sending end at the same time. In this way, data lost can be avoided during remote transmission, i.e. before the flow control frame is reached the sending end, data packets having been sent is not lost at the receiving end. Consequently, reliability of data remote transmission is increased.

In the invention, a flow control frame is sent according to a preset receiving high threshold-value and a receiving low threshold-value. When a data volume in the buffer reaches the receiving high threshold-value, a flow control frame with a time parameter will be sent to pause data sending at the sending end. When a data volume in the buffer reaches the receiving low threshold-value, a flow control frame with a time parameter equals to zero will be sent, and the sending end sends data normally. When a data volume in the buffer is even less than the receiving low threshold-value, no flow control frame is sent and resource for sending flow control frame is saved.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
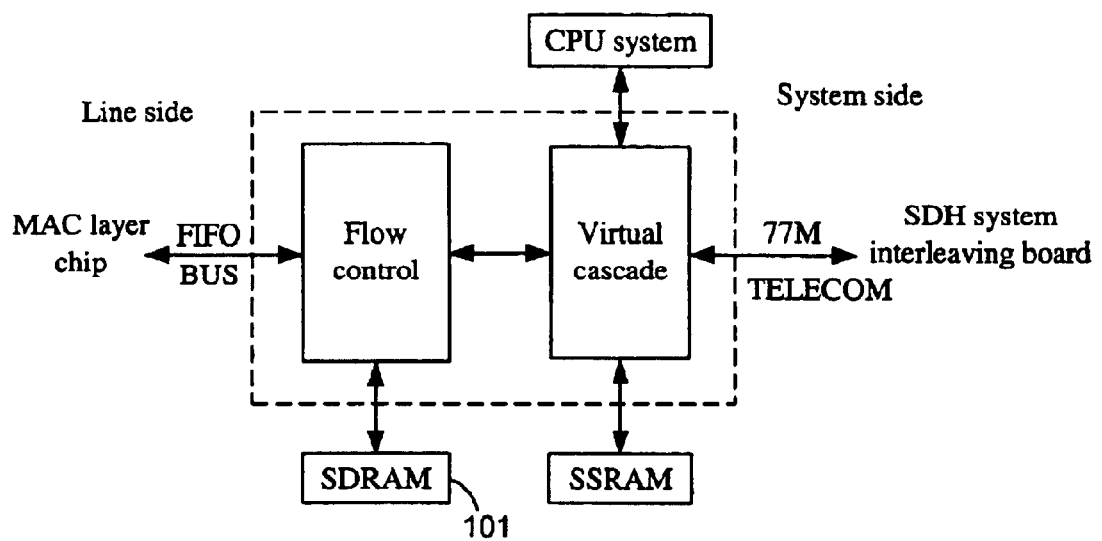
FIG. 1 shows a system block diagram of the invention.

Reference to FIG. 1, a SDRAM 101, which is used as buffer storage to store the Ethernet data without being processed in time at receiving end, is added on the bus of receiving direction in a programmable logic array. A receiving high threshold-value and a receiving low threshold-value of the buffer storage are preset to control the sending of flow control frames. The size and threshold-value of the buffer storage are determined by the longest transfer distance of Ethernet data in the SDH transmission network and delays of SDH facilities etc.

Because of transmission delay, in an Ethernet data remote transmission, a flow control frame arriving moment is later than the moment that the receiving end of Ethernet data cannot receive data correctly, and data transferred between these two moments are lost. With enough capacity of SDRAM 101, data transferred between these two moments are stored, and flow control frames will be sent according to the situation of the current data volume in the buffer storage. When the data volume having been received by the buffer storage is equal to the receiving high threshold-value, then a flow control frame with a time parameter will be sent to the sending end to pause the data sending. Having a time parameter is in accordance with specification of standard protocols, and the time parameter is used for pausing data sending. When the data volume having been received by the buffer storage is equal to the receiving low threshold-value, then a flow control frame, with zero time parameter, will be sent to inform the sending end that data packets can be sent normally.

Figure 2:
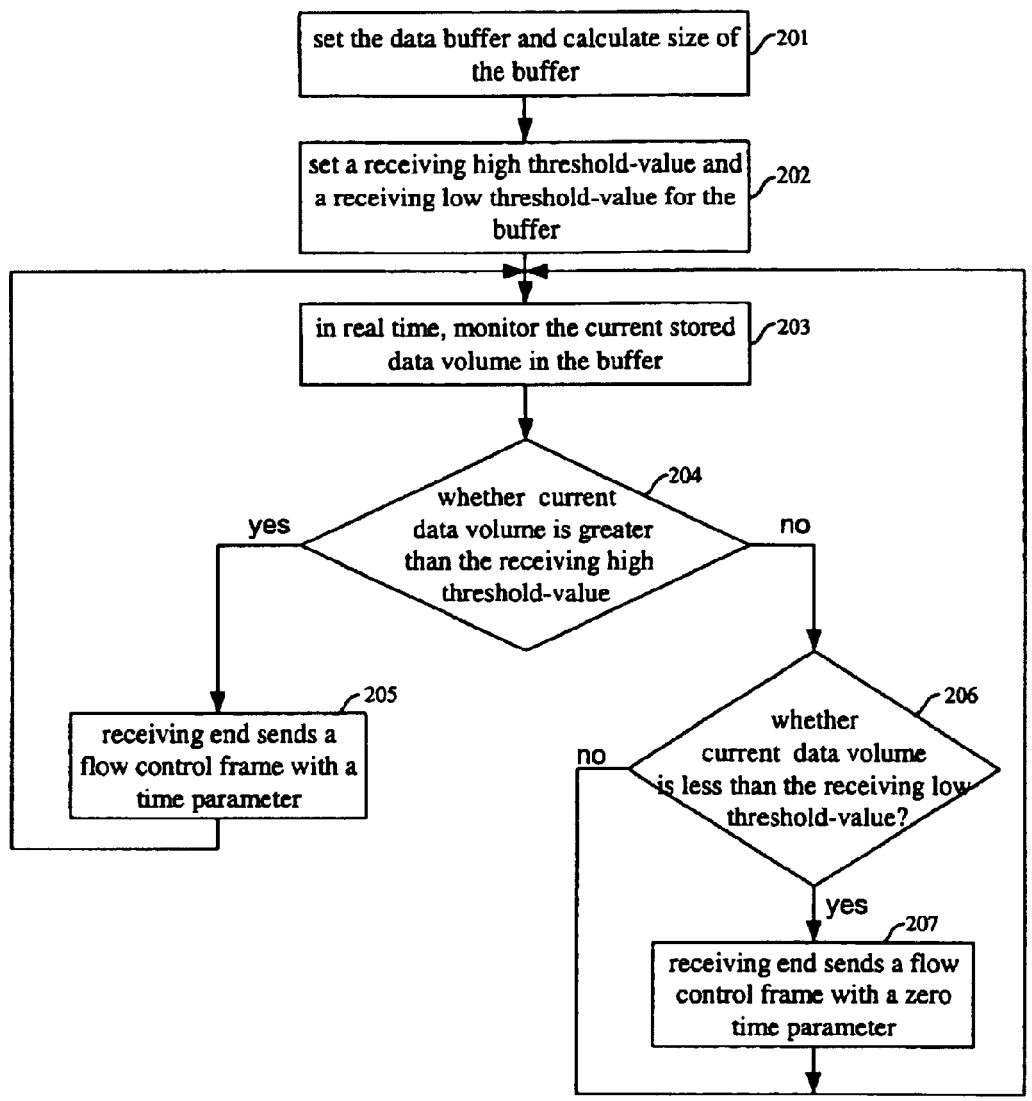
FIG. 2 shows a flow chart of the invention.

FIG. 2 shows that a method of the invention at least includes the following two steps:

(1) including steps 201 and 202. First, size of the buffer is calculated, according to transmission distance of the SDH network, the number of the network element stations, port transmission rate and time delays of every parts etc. Then, the buffer, a receiving high threshold-value and a receiving low threshold-value of the buffer are set.

Suppose the transmission delay, calculated by known parameters, is C, then the default receiving low threshold-value is C and the capacity of SDRAM is 2 C. i.e. 2 C are the total data volume before data are lost.

Suppose the transmission distance of a SDH network is 100 kilometers, and time delay of one kilometer is 5 $\mu s$ because optical speed in a fiber is 200 thousands kilometers per second; and Suppose there are 16 network element stations and time delay of each network element is 10 $\mu s$, in real it may be larger then 10 $\mu s$; and maximum time delay compensation of the SDH network is 6 ms; and Suppose the maximum processing time delay inside an Ethernet is 8* 1536=12288 bytes, wherein 1536 bytes is the maximum frame length in Ethernet, and transmission rate at port of Gigabits Ethernet is 125 Mbytes/s; then The whole transmission time delay C (represented by bytes) is shown with the following formula:

$$C = 2 \times \{(100 \times 5 \times 10^{-6} + 16 \times 10 \times 10^{-6} + 6 \times 10^3) \times 125 \times 10^6 + 12288\}$$
$$= 1,689,576 \text{ Bytes.}$$

Wherein the formula multiplied with 2 shows that there are two inputs of the access module. It can be conducted that capacity of one direction SDRAM 2 C is about 4M bytes.

The example above shows that adding a 4M bytes capacity of the buffer will support a SDH network with 100 kilometers transmission distance, 16 network stations and a less than 6 ms SDH frame time delay. Obviously, the invention method can support an Ethernet remote transmission on a SDH network, and the transmission distance is longer than 100 kilometers.

(2) steps 203, 204, 205, 206 and 207 monitors the current data volume in the buffer in real time to decide whether to send an appropriate flow control frame.

In this embodiment, the receiving high threshold-value is the high level and the receiving low threshold-value is the lower level. The system monitors, in real time, the current data volume in the buffer is as follow. If data volume in the buffer is reached the high level, then the receiving end sends a flow control frame to the sending end with a 0×FFFF time parameter and the system returns to the real time monitoring state. If the data volume has not been reached the high level, then it is decided whether the data volume is reached the low level. If so, then the receiving end sends a flow control frame to sending end with 0×0000 time parameter and the system returns the real time monitoring state, otherwise the system returns the real time monitoring state directly.

The real time monitoring data volume in a buffer is a loop working continuously.

In order to guarantee the reliability of a flow control frame transmission, there are two manners to send flow control frame for many times. One is preset a re-transmission number N, and sends a flow control frame N times continuously. Another depends on an acknowledge information sent by the opposite end to decide whether sending of the flow control frame is successful. If it is not successful, send the flow control frame again to guarantee it reaching destinations reliably. Consequentially, the effectivity of the flow control frame is guaranteed.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for controlling Ethernet data flow on a synchronous digital hierarchy (SDH) transmission network, comprising:

a. setting a data buffer at receiving direction of a programmable logic array, wherein size of the data buffer is determined by Ethernet data transmission distance on the SDH transmission network and transmission rate of Ethernet ports;

b. setting a receiving high threshold-value and a receiving low threshold-value for the data buffer, and controlling the data flow with the relation between current data volume of the data buffer and the receiving threshold-value.

2. The method according to claim 1, wherein the data buffer is a synchronous data random access memory (SDRAM).

3. The method according to claim 1, wherein size of the data buffer is further determined by delays of SDH facilities, stations number of network elements, delays of network elements, delay compensation of the SDH network, and inner processing delay of Ethernet.

4. The method according to claim 1, wherein the receiving high threshold-value and the receiving low threshold-value are determined by transmission distances of Ethernet data on the SDH transmission network, delays of the SDH facilities.

5. The method according to claim 1, further comprising:

c. monitoring current data volume of the data buffer in real time and detecting whether the current data volume reaches the receiving high threshold-value;

d. if current data volume of the data buffer reaches the receiving high threshold-value, then sending out a flow control frame with time parameter at receiving end and returning to step c;

e. if current data volume of the data buffer does not reach the receiving high threshold-value, then detecting again whether the current data volume reaches the receiving low threshold-value of the data buffer; if it so, then sending out a flow control frame with zero time parameter at receiving end and returning to step c; otherwise, returning to step c directly.

6. The method according to claim 5, wherein the time parameter in a flow control frame is the longest time for pausing data sending at sending end, and the time parameter is defined by the standard protocol.

7. The method according to claim 5, wherein the receiving high threshold-value and the receiving low threshold-value are determined by transmission distances of Ethernet data on the SDH transmission network, delays of the SDH facilities.

8. The method according to claim 3, wherein the inner processing delay of Ethernet is determined by maximum frame length in Ethernet.

9. The method according to claim 1, wherein the size of the data buffer includes:

summing the delay of transmission distance of the SDH network, and the delay of all network element stations, and the delay compensation of the SDH network;

multiplying the result of summing by the transmission rate of Ethernet ports;

summing the result of multiplying and the inner processing delay of Ethernet, gained whole transmission time delay; and multiplying the whole transmission time delay by four.

10. The method according to claim 9, wherein the inner processing delay of Ethernet is the product of the maximum frame length in Ethernet and eight.

\* \* \* \* \*